(12) United States Patent
Hammerich et al.

(10) Patent No.: US 7,992,128 B2
(45) Date of Patent: Aug. 2, 2011

(54) COMPUTER SOFTWARE ADAPTATION METHOD AND SYSTEM

(75) Inventors: Reiner P. Hammerich, Wiesloch (DE); Thomas Chadzelek, St. Ingbert (DE)

(73) Assignee: SAP AG, Walldorf (DE)

(*) Notice: Subject to any disclaimer, the term of this patent is extended or adjusted under 35 U.S.C. 154(b) by 1231 days.

(21) Appl. No.: 11/340,655

(22) Filed: Jan. 27, 2006

(65) Prior Publication Data
US 2007/0240100 A1 Oct. 11, 2007

(51) Int. Cl.
*G06F 9/44* (2006.01)

(52) U.S. Cl. ........ 717/106; 717/107; 717/108; 717/121; 717/125

(58) Field of Classification Search .................. 717/104, 717/106, 121, 168, 177; 706/11; 707/1
See application file for complete search history.

(56) References Cited

U.S. PATENT DOCUMENTS

| | | | | |
|---|---|---|---|---|
| 4,558,413 A * | 12/1985 | Schmidt et al. | ............... | 707/203 |
| 5,485,401 A * | 1/1996 | Cadman | ........................ | 702/116 |
| 5,485,601 A * | 1/1996 | Ching | ............................ | 717/106 |
| 5,495,565 A | 2/1996 | Millard et al. | | |
| 5,590,270 A * | 12/1996 | Tsukuda et al. | .............. | 717/121 |
| 5,604,743 A * | 2/1997 | Le Guigner et al. | .......... | 370/392 |
| 6,016,394 A * | 1/2000 | Walker | .......................... | 717/104 |
| 6,226,788 B1 * | 5/2001 | Schoening et al. | ............ | 717/107 |
| 6,405,366 B1 * | 6/2002 | Lorenz et al. | ................. | 717/107 |
| 6,542,901 B1 * | 4/2003 | Devine et al. | ............. | 707/104.1 |
| 6,690,981 B1 * | 2/2004 | Kawachi et al. | ................ | 700/83 |
| 6,756,285 B1 * | 6/2004 | Moriceau et al. | ............. | 438/455 |
| 6,926,199 B2 * | 8/2005 | Jay et al. | ........................ | 235/375 |
| 7,035,837 B2 * | 4/2006 | Reulein et al. | ........................ | 1/1 |
| 7,051,327 B1 * | 5/2006 | Milius et al. | ................... | 717/177 |
| 7,111,016 B2 * | 9/2006 | Gurevich | ..................... | 717/108 |
| 7,334,218 B2 * | 2/2008 | Akelbein et al. | ............... | 717/121 |
| 7,493,594 B2 * | 2/2009 | Shenfield et al. | ............. | 717/107 |
| 7,526,457 B2 * | 4/2009 | Duevel et al. | .................... | 706/11 |
| 2003/0052912 A1 * | 3/2003 | Bowman et al. | ............... | 345/738 |
| 2003/0144982 A1 * | 7/2003 | Reulein et al. | ..................... | 707/1 |
| 2003/0149708 A1 * | 8/2003 | Tsao | .......................... | 707/104.1 |
| 2003/0163594 A1 * | 8/2003 | Aasheim et al. | .............. | 709/310 |
| 2004/0015955 A1 * | 1/2004 | Bourke-Dunphy et al. | .. | 717/174 |
| 2004/0117439 A1 * | 6/2004 | Levett et al. | ................... | 709/203 |
| 2005/0097547 A1 * | 5/2005 | Ramachandran et al. | .... | 717/177 |
| 2005/0138558 A1 * | 6/2005 | Duevel et al. | ................. | 715/700 |

(Continued)

OTHER PUBLICATIONS

"Dynamic Software Updating", Michael Hicks, Nov. 2005, pp. 1-48, <http://delivery.acm.org/10.1145/1110000/1108971/p1049-hicks.pdf?key1=1108971&key2=6952655031&coll=DL&dl=ACM&ip=151.207.242.4&CFID=21650132&CFTOKEN=85456292>.*

"The Mapping Problem Back and Forth: Customizing Dynamic Models while preserving Consistency", Tim Clerckx et al., 2004, pp. 1-10, <http://delivery.acm.org/10.1145/1050000/1045455/p33-clerckx.pdf?key1=1045455&key2=8853855031&coll=DL&dl=ACM&ip=151.207.242.4&CFID=23477623&CFTOKEN=30608322>.*

(Continued)

*Primary Examiner* — Thuy Dao
*Assistant Examiner* — Ziaul A. Chowdhury
(74) *Attorney, Agent, or Firm* — Finnegan, Henderson, Farabow, Garrett & Dunner, LLP (57) ABSTRACT

A method is provided for creating and/or utilizing a computer software application. The method may include structuring the application into a first software layer and a second software layer and defining a plurality of data elements used by the application. The method may also include establishing the first software layer based on the data elements for processing the data elements and creating the second software layer including adaptation data to present the plurality of data elements modified by the adaptation data associated with the data elements. Further, the adaptation data may enable plural presentations of the data elements by the second software layer independently from the first software layer.

20 Claims, 6 Drawing Sheets

U.S. PATENT DOCUMENTS

| | | | |
|---|---|---|---|
| 2005/0160070 A1* | 7/2005 | Mashni et al. | 707/1 |
| 2005/0188349 A1* | 8/2005 | Bent et al. | 717/106 |
| 2005/0198563 A1 | 9/2005 | Kristjansson | |
| 2005/0257148 A1 | 11/2005 | Goodman et al. | |
| 2005/0283764 A1* | 12/2005 | Chiu | 717/125 |
| 2006/0048130 A1* | 3/2006 | Napier et al. | 717/168 |
| 2006/0059458 A1* | 3/2006 | Plummer | 717/108 |
| 2006/0236302 A1* | 10/2006 | Bateman et al. | 717/104 |
| 2006/0248506 A1* | 11/2006 | Luo et al. | 717/104 |
| 2007/0064698 A1* | 3/2007 | Appanna | 370/392 |
| 2007/0240100 A1* | 10/2007 | Hammerich et al. | 717/104 |

OTHER PUBLICATIONS

"A Common Data Management Infrastructure for Adaptive Algorithms for PDE Solutions", Manish Parashar et al., 1997, pp. 1-22,<http://delivery.acm.org/10.1145/510000/509649/a56-parashar.pdf?key1=509649&key2=7973855031&coll=DL&dl=ACM&ip=151.207.242.4&CFID=23477623&CFTOKEN=30608322111>.*

* cited by examiner

| | |
|---|---|
| First Name | ☐ ~402 |
| Last Name | ☐ ~404 |
| City | ☐ ~406 |
| Street | ☐ ~408 |
| Country | ☐ ~410 |
| | [Save] ~412 |

FIG. 4

| | |
|---|---|
| First Name | ☐ ~402 |
| Last Name | ☐ ~404 |
| City | ☐ ~406 |
| Street | ☐ ~408 |
| Country | US ~410 |
| | [Save] ~412 |

FIG. 5

First Name [____] ~402

Last Name [____] ~404

City [____] ~406

Street [____] ~408

Save ~412

FIG. 6

Last Name [____] ~404

First Name [____] ~402

City [____] ~406

Street [____] ~408

Country [____] ~410

Save ~412

COMPUTER SOFTWARE ADAPTATION METHOD AND SYSTEM

TECHNICAL FIELD

The present invention generally relates to the field of computer application software adaptation and, more particularly, to methods and systems for adapting software applications with minimum modifications.

BACKGROUND

Computer software programs or applications are often developed to solve a particular set of problems for potential users of the computer software programs. Because the users of the applications may use the applications to solve different problems or to solve the particular set of problems under specific circumstances, which may be different from predicted circumstances during the development of the software applications, adaptation of the software applications may be required for the applications to be used by the particular users to address their own needs.

On the other hand, the software programs may be revised or upgraded by software developers or vendors. Because adaptations may be made by the users, the users may require the revised or upgraded versions of the applications to work with the previously made adaptations with minimum or no effort to modify the software programs.

To address the issues of adaptation, certain software vendors provide source code of the software applications along with tools required to manipulate the source code, to the users. The users may modify the source code with the tools to make customized software builds and to deploy the adapted software applications. However, such approaches may often involve a large effort to use the tools, to understand the source code, and/or to make the adaptations. Further, any revision or upgrade made by the software vendors may still require the applications to be modified in order to be used, because the previously user-made modification may be unworkable with the new changes in the applications made by the software vendors. Moreover, software developers generally prefer not to release valuable source code.

Certain other software vendors, on the other hand, approach these issues by defining explicitly the options that can be adapted within the scope of the applications. These options may be pre-thought and implemented as configuration data, such as a set of values for a particular variable, to address a specific use case. The applications may read the configuration data directly in a specific order or sequence to determine particular options. That is, an application and its associated configuration data may be inseparable. Thus, these options may not be changed without restarting the application.

In addition, such approaches may often involve a large number of configuration tools and specific configurable options. Because pre-thought and specific options cannot predict all use cases or circumstances, certain adaptations of the applications may still need to be made in the applications themselves. In addition, revisions or upgrades to the applications may also change the pre-thought options or change the order of data, thus causing the previously made adaptations incompatible with the revisions or upgrades. Such incompatibilities may increase significantly in complex applications, such as user interface intensive applications.

In certain web-based applications, some software vendors may use features such as auto-fill to eliminate the need for entering repetitive data by the users when filling out certain fields of a form or table. Such features may often provide default values of frequently used information such as names, email addresses, and street addresses on behave of the users. For example, U.S. Patent Application Publication No. 2005/0257148, published on Nov. 17, 2005, to Goodman et al., discloses an intelligent auto-fill method in which machine learning techniques are used to automatically fill one or more fields across a diverse array of web forms. However, such auto-fill features may often be limited to providing default values of the frequently used information for the convenience of the users by analyzing the usage history of such information and may often fail to address relationships between the applications and adaptations of the applications.

Methods and systems consistent with certain features of the disclosed embodiments are directed to solving one or more of the problems set forth above.

SUMMARY

One aspect of the present invention includes a method for creating a computer software application. The method may include structuring the application into a first software layer and a second software layer and defining a plurality of data elements used by the application. The method may also include establishing the first software layer based on the data elements for processing the plurality of data elements and creating the second software layer. The second software layer may include adaptation data to present the data elements modified by the adaptation data associated with the data elements. Further, the adaptation data may enable plural presentations of the data elements by the second software layer independently from the first software layer.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
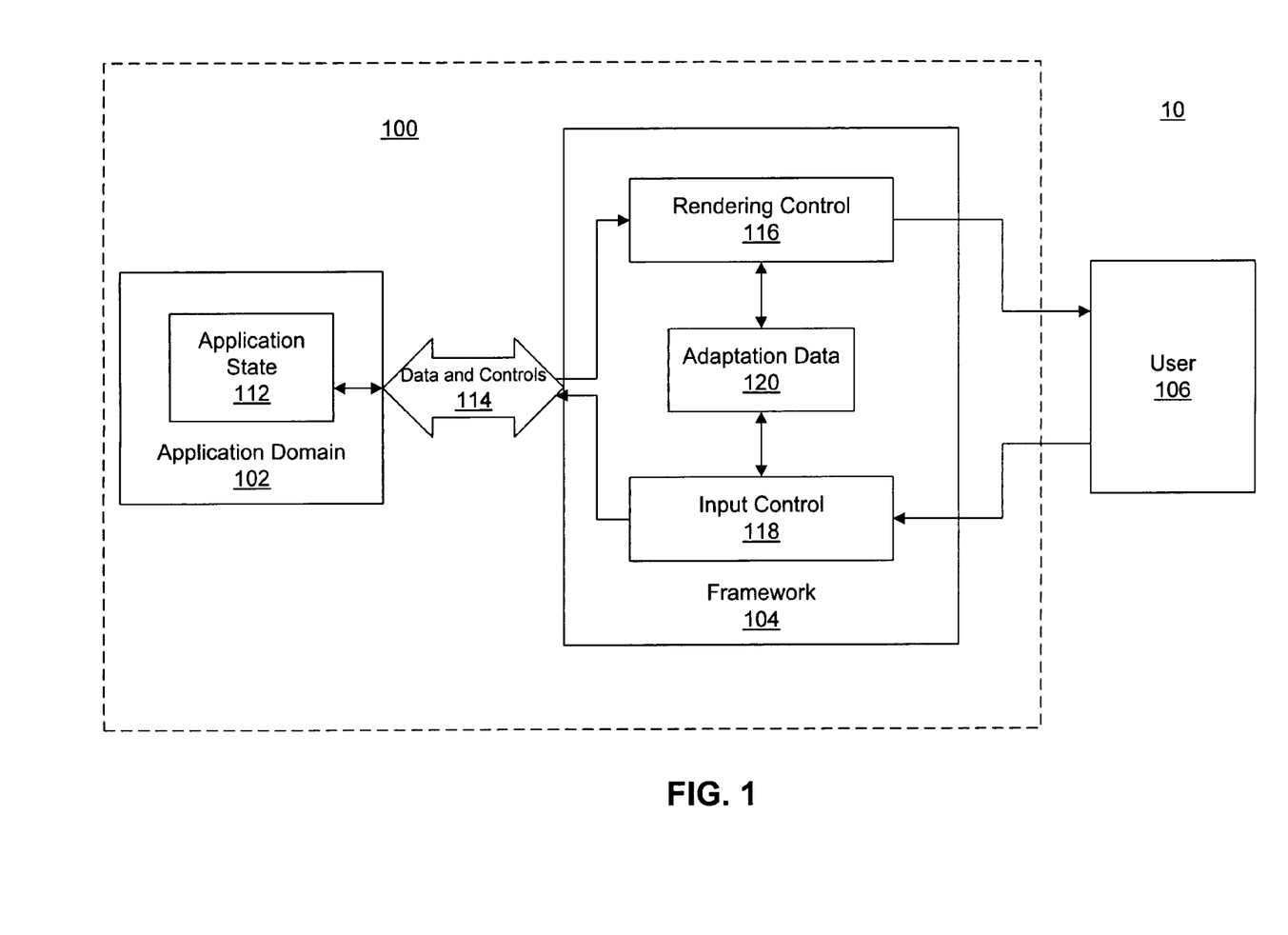
FIG. 1 illustrates a block diagram of an exemplary application development and adaptation environment consistent with certain disclosed embodiments.

FIG. 1 illustrates a block diagram of an exemplary application development and adaptation environment 10 consistent with certain disclosed embodiments. As shown in FIG. 1, application development and adaptation environment 10 may include an application 100 and a user 106. Application 100 may include any appropriate type of computer software program having certain features such that desired adaptations may be made to application 100 by a user or users of the application. An adaptation of an application, or computer software program, may refer to any particular arrangement and/or modification of the application that may enable a customer or user of the application to use the application in a specific use case and/or to continue using the particular arrangement and/or modification with a new version or upgrade of the application. A desired adaptation may refer to the adaptation that is made in such a way that the adaptation may be compatible with the new version, or upgrade, of the application with minimum or no modifications. A desired adaptation may reduce both total cost of development (TCD) and total cost of ownership (TCO).

User 106 may include any actual user or users of application 100 and/or any appropriate computer programs or systems that interact with application 100. When an actual user is involved, user 106 may interact with application 100 via various user interfaces (UI), such as a graphical user interface (GUI) or any other textual or visual interfaces.

Application 100 may include an application domain 102 and a framework 104. Application domain 102 may include any appropriate type of functionality of interest under the control of application 100. In particular, application domain 102 may be defined by application programming interfaces (APIs), features, programming languages, and/or other characteristics of application 100. Further, application domain 102 may include an application state 112.

Application state 112 may include any state created by application 100. Application state 112 may be determined by status of a set of data and/or data controls of application 100, such as a set of user interface (UI) elements and/or UI controls, etc. Operations of application 100 may change values of the set of data and/or data controls and may create a corresponding application state 112 based on the values. A certain state may be of interest to user 106 and may be presented to user 106 through framework 104. On the other hand, user 106 may change the state of application 100 (e.g., application state 112) through framework 104.

As shown in FIG. 1, framework 104 may be a separate entity from application domain 102. In other implementations, the architecture may be different, provided functionality consistent with the invention is implemented. Framework 104 may provide certain data processing functions between application state 112 and user 106 such that adaptation of application 100 may be made independently from application state 112 or application domain 102. That is, adaptation of application 100 by user 106 may be carried out by framework 104 and changes in application domain 102 or application state 112 may have little or no impact on the adaptation made in framework 104. In one embodiment, adaptation of application 100 is implemented without any modification to application domain 102 or application state 112. In another embodiment, minimum changes may be made in application domain 102 or application state 112 such that certain features may be created or modified in application domain 102 and/or framework 104.

The separation between framework 104 and application domain 102 may depend on certain characteristics of application 100. For example, if application 100 is a local application, framework 104 and application domain 102 may be implemented as separate software programs that may be executed on a same computer. On the other hand, if application 100 is a distributed application, framework 104 and application domain 102 may be separate software programs executed on different computers or processors. Although FIG. 1 shows that exemplary application 100 includes both application domain 102 and framework 104, other configurations may also be used. For example, framework 104 may be created outside or independent from application 100 such that more than one applications may be adapted by framework 104.

Framework 104 may be associated with application domain 102 (or application state 112) via data and controls 114. Data and controls 114 may include any appropriate type of passive and/or active data representations of the set of data and/or data controls exchanged between framework 104 and application domain 102. Passive data may refer to simple data used by software programs or applications, and active data may refer to both data and computer programs or tools associated with the data for manipulating the data. For example, data and controls 114 may include data representation of UI elements and/or UI controls exchanged between framework 104 and application domain 102. However, other data and controls, such as XML, HTML, program, code, objects, etc., may also be used.

Framework 104 may include any appropriate type of software program and/or software tool to provide certain treatments and/or arrangements of data and controls 114 associated with application state 112. For example, framework 104 may include a rendering control 116 to render the UI elements and/or UI controls for application state 112. Rendering control 116 may, for instance, draw pixels or generate HTML pages corresponding to data and controls 114. Other types of rendering, however, may also be used. Further, rendering control 116 may also include software programs control other types of output to user 106, such as text, audio, visual, and/or file outputs, etc.

Framework 104 may also include an input control 118 to control information selected, manipulated, and/or inputted from user 106. For example, input control 118 may include software programs gathering information provided by user 106, such as information in a field of a form and/or information inputted (e.g., typed) by the user, for example, in response to a particular output. Input control 118 may provide information via data and controls 114 such that application domain 102 or application state 112 may obtain such information from user 106.

Framework 104 may also include adaptation data 120 to allow user 106 to make certain adaptations to framework 104 (which may be considered an adaptation of application 100). Adaptation data may refer to any data used to adapt a software application. In particular, in UI related applications, adaptation data may refer to any data related to changing the characteristics of UI elements and/or controls of the UI related applications.

Adaptation data 120 may include any appropriate type of information that may be provided to framework 104, particularly to rendering control 116 and/or input control 118, such that framework 104 may behave in a way that meets a personalized requirement from user 106 (i.e., personalization data). For example, if application 100 uses UI elements and/or UI controls to interact with user 106, adaptation data 120 may include information to personalize certain UI control properties. Non-limiting examples of such control properties may include replacing UI controls using adequate substitutes; showing and hiding UI controls; replacing icons, other objects, and logos, etc.; moving UI controls; changing one or more sequences of UI controls; adding UI controls (e.g. a link to a web page); changing UI control state from "enabled" to "disabled," or from "visible" to "invisible," etc.; applying default values for input enabled UI controls; marking UI controls as "required" or "mandatory"; changing labels of fields of UI controls; changing number and sequences of columns in a table or list of UI controls; changing the width of a column in a table or list of UI controls; changing the heading of columns in a table or list of UI controls; changing the order of tab items in a tab strip of UI controls; disabling tab items of UI controls; adding new tab items to a tab strip of UI controls; change of terminologies of UI controls, etc.

Adaptation data 120 may be generated by any appropriate methods. For example, adaptation data 120 may be generated by user 106 manually or via certain tools, which may be included in or associated with framework 104. Adaptation data 120 may also be generated automatically by other software programs. After adaptation data 120 is generated, rendering control 116 may use adaptation data 120 to render data and controls 114 from application state 112 to present the data to user 106. On the other hand, input control 118 may also use adaptation data 120 to provide data from user 106 to application state 112 through data and controls 114.

Figure 2:
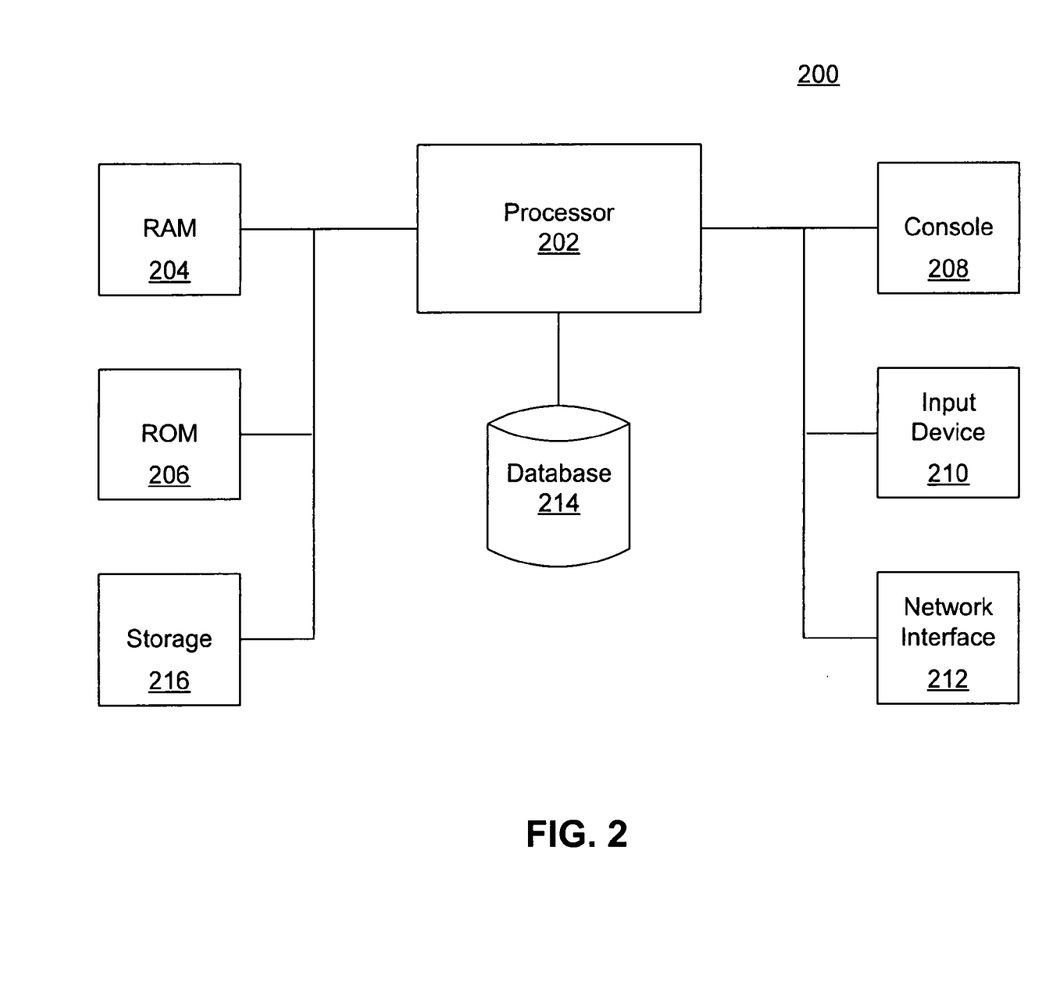
FIG. 2 illustrates a block diagram of a computer system consistent with certain disclosed embodiments.

The creation, adaptations, and/or operations of application 100 may be carried out by one or more computer systems. FIG. 2 shows a functional block diagram of an exemplary computer system 200 that may be used to perform the creation, adaptations, and/or operations of application 100.

As shown in FIG. 2, computer system 200 may include a processor 202, a random access memory (RAM) 204, a read-only memory (ROM) 206, a console 208, an input device 210, a network interface 212, a database 214, and a storage 216. It is understood that the type and number of listed devices are exemplary only and not intended to be limiting. The number of listed devices may be changed and other devices may be added.

Processor 202 may include any appropriate type of general purpose microprocessor, digital signal processor, or microcontroller. Processor 202 may execute sequences of computer program instructions to perform various processes as explained above. Processor 202 may be coupled to or access other devices, such as RAM 204, ROM 206, console 208, input device 210, network interface 212, database 214, and/or storage 216, to complete executions of computer program instructions. The computer program instructions may be loaded into RAM 204 for execution by processor 202 from read-only memory (ROM) 206, or from storage 216. Storage 216 may include any appropriate type of mass storage provided to store any type of information that processor 202 may need to perform the processes. For example, storage 216 may include one or more hard disk devices, optical disk devices, or other storage devices to provide storage space.

Console 208 may provide a graphic user interface (GUI) or other user interfaces to display information to users of computer system 200. Console 208 may include any appropriate type of computer display device or computer monitor. Input device 210 may be provided for users to input information into computer system 200. Input device 210 may include a keyboard, a mouse, or other optical or wireless computer input device, etc. Further, network interface 212 may provide communication connections such that computer system 200 may be accessed remotely through computer networks via various communication protocols, such as transmission control protocol/internet protocol (TCP/IP), hyper text transfer protocol (HTTP), etc.

Database 214 may contain design parameters, model data and/or any information related to software applications. Database 214 may include any type of commercial or customized database. Database 214 may also include analysis tools for analyzing the information in the database.

Figure 3:
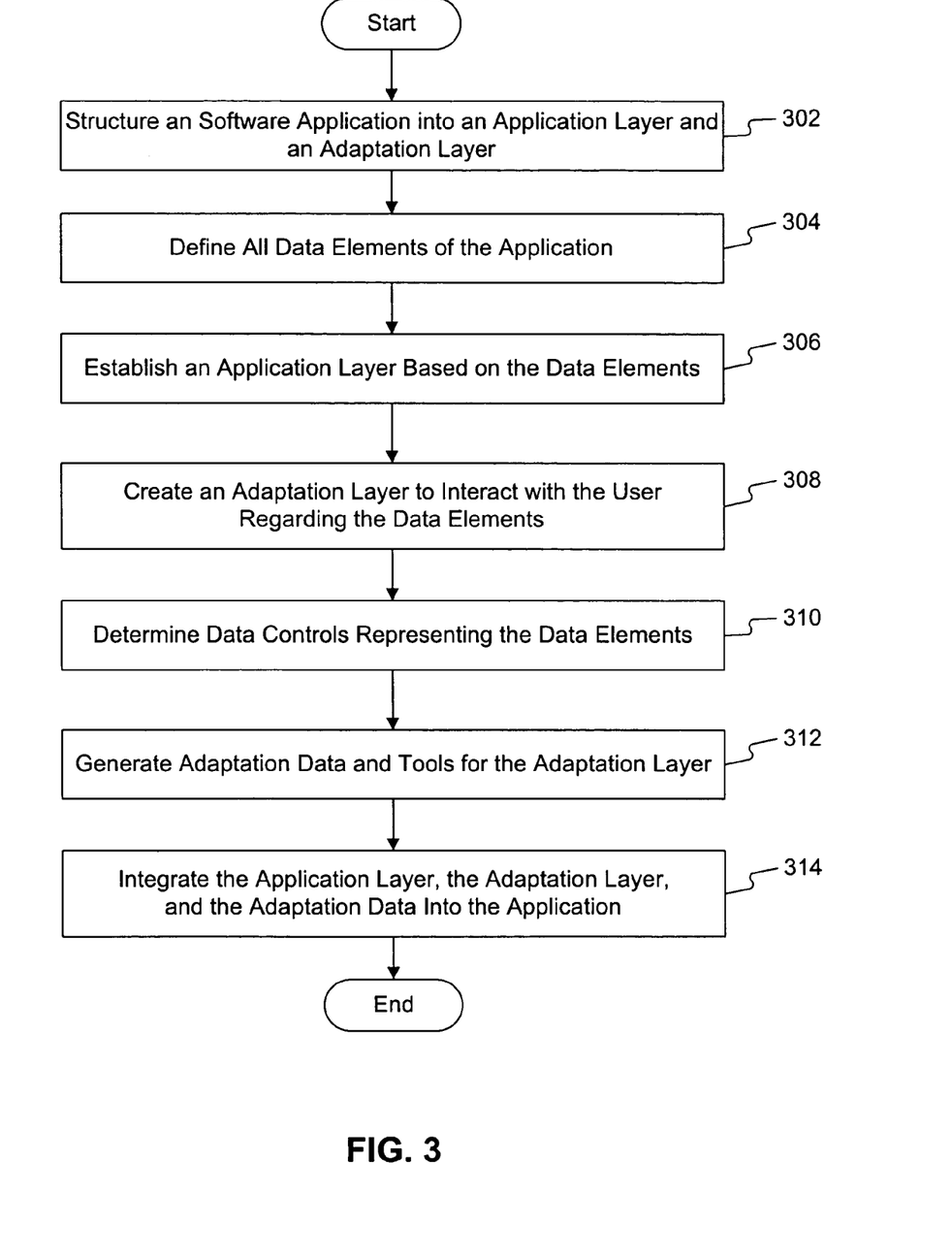
FIG. 3 illustrates a flowchart of an exemplary application developing process consistent with certain disclosed embodiments.

Processor 202 may execute certain software programs to create application 100 and/or adaptations of application 100, and to execute application 100 to perform certain functions provided by application 100. FIG. 3 illustrates a flowchart of an exemplary application developing process consistent with certain disclosed embodiments. For illustrative purposes, an exemplary address table application 400 of FIGS. 4-7 is discussed along with the process illustrated in FIG. 3. FIGS. 4-7 show certain user interfaces of an address table application 400, where user 106 may be presented address data and may input certain address data.

As shown in FIG. 3, processor 202 may structure an computer software application under development into an application layer (e.g., application domain 102, application state 112, etc.) and an adaptation layer (e.g., framework 104, etc.) (step 302). Other structures, however, may also be used. For example, processor 202 may couple more than one application layers with one adaptation layer.

Processor 202 may structure an application layer and an adaptation layer based on data elements, functionalities of the application, and/or predetermined standards, such as distributed computing standards, etc. (step 302). In one implementation, the application layer corresponds to application domain 102 and the adaptation layer corresponds to framework 104 of FIG. 1. The application layer and the adaptation layer may share certain data elements (e.g., data and controls 114) of the application.

Processor 202 may define all the data elements of application 100 (step 304). All data elements may refer to any possible data elements that may be shared or exchanged between application domain 102 and framework 104. For example, address table application 400 in FIG. 4 may include data elements such as first name 402, last name 404, city 406, street 408, country 410, and save 412. User 106 may enter information in each field of the address table and selects "save" 412 to process the information entered. Processor 202 may define the data elements including all the fields or elements (e.g., first name 402, last name 404, city 406, street 408, country 410, and save 412). Processor 202 may define the data elements either automatically or under the instructions of a software developer.

After defining all the data elements (step 304), processor 202 may establish an application layer (e.g., application domain 102) based on the data elements (step 306). In the example of address table application 400, processor 202 may establish an application layer to process or handle the address information represented by all the data elements (e.g., first name 402, last name 404, city 406, street 408, country 410, and save 412). That is, processor 202 may establish application 102 and application state 112 by using available APIs and/or other programming resources to process the address information, such as to store, to edit, to parse, and to analyze, etc., the address information.

Processor 202 may also create an adaptation layer (e.g., framework 104) to interact with user 106 regarding the data elements (step 308). That is, processor 202 may create framework 104 (e.g., rendering control 116 and input control 118, etc.) using programming resources. Processor 202 may implement framework in various ways. For example, processor 202 may implement rendering control 116 as rendering adapters and rendering manager software programs. Any appropriate type of computer programming language may be used.

Further, processor 202 may determine data and controls representing all the data elements (step 310). For example, processor may determine first name 402, last name 404, city 406, street 408, and country 410 as respective data fields of a table, and may determine save 412 as a button. The determined data and controls may be incorporated into application domain 102 and framework 104 in different data representations, because application domain 102 and framework 104 may use different data representation methods. For example, the data elements may be implemented as different structures and/or classes in application domain 102 and framework 104, respectively. The structures and/or class may carry all data fields, such as all data fields of the address table.

Processor 202 may also generate adaptation data 120 and/or adaptation tools for the adaptation layer (e.g., framework 104) (step 312). In the example of address table application 400, processor 202 may generate adaptation data 120 for each UI element and/or control. Because each of UI elements and/or UI controls may have properties such as visible, enabled and a value, etc., processor 202 may set proper values or characteristics of the UI elements and/or controls. Tools such as editors, menus, runtime pop-up windows, and/or other editing or configuring tools may be included in the adaptation layer. In one embodiment, tools may also be provided for each of the UI elements and/or UI controls.

Figure 4:
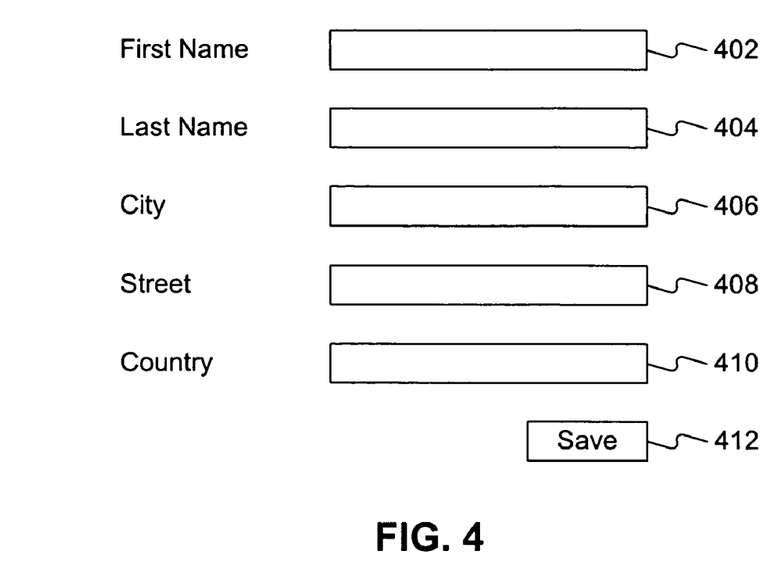
FIG. 4 illustrates an exemplary user interface of an address table application consistent with certain disclosed embodiments.

The values or characteristics may be provided to rendering control 116 and/or input control 118 by means of data binding or by certain application code that read the values or characteristics to rendering control 116 and/or input control 118. The rendered data may be presented to user 106, as shown in FIG. 4. For example, address table application 400 may be used by a customer that only operates in a certain country, such as U.S. Thus, the customer may want to adapt address application 400 such that a default of "US" may be provided by address application 400 and the customer does need to enter this information.

Figure 5:
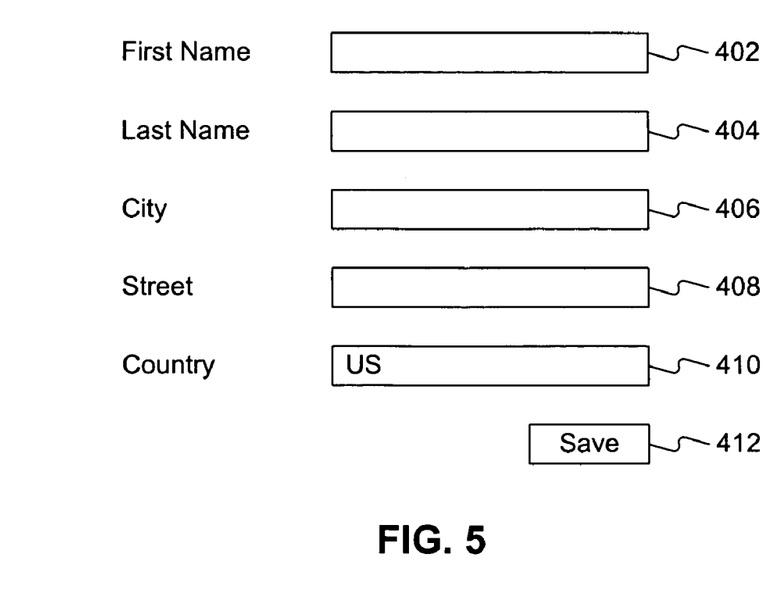
FIG. 5 illustrates another exemplary user interface consistent with certain disclosed embodiments.

The customer may adapt address table application 400 by assigning a value (e.g., "US") to country 410. The assigning default value of "US" may be included in adaptation data 120. When rendering control 116 renders the address table, "US" may be provided to rendering control 116 and may be presented to the customer automatically. On the other hand, when the customer selects "save" 412, even if the customer leave country 410 blank, input control 118 may be provided with "US" regarding country 410. Thus application domain 102 may still obtain "US" as the value of country 410 without any modification. That is, the input format to address table application is consistent while the presentation in both rendering and input of the address information may be different or in more than one formats.

Figure 6:
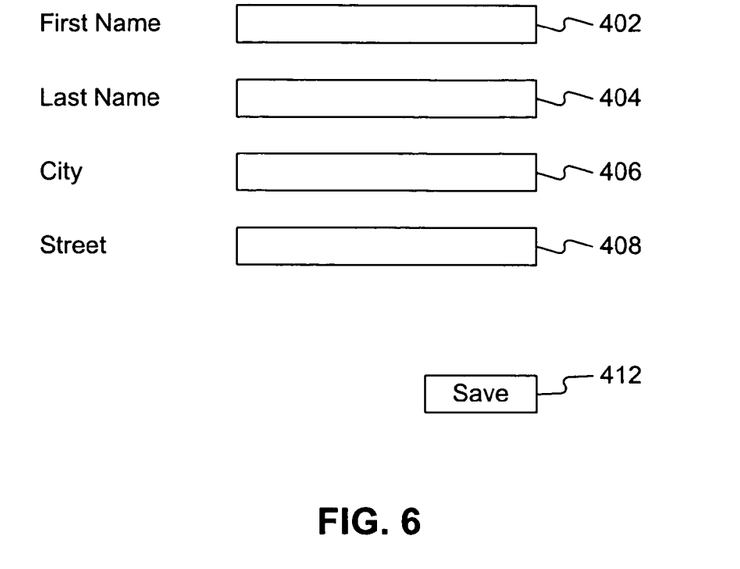
FIG. 6 illustrates another exemplary user interface consistent with certain disclosed embodiments.

In another example illustrated in FIG. 6, country 410 may be set to invisible so that the customer does not need to consider the field. When rendering control 116 renders the address table, rendering control 116 may determine that country 410 is invisible and should not be presented to the customer. However, when the customer selects "save" 412, adaptation data 120 may still assign the value (e.g., "US") to country 410, even if the customer is not presented with country 410. Therefore, input control 118 may look up the adaptation data and still provide a default value of "US" regarding country 410 to application domain 102. Thus, application domain 102 may still obtain "US" as the value of country 410 without any modification to application domain 102 or application state 112 to deal with any missing data fields (e.g., country 410). In this manner adaptation data 120 has the effect of reconfiguring or specially configuring the display output to the user as oppose to simply inputting a default value in a display element.

Figure 7:
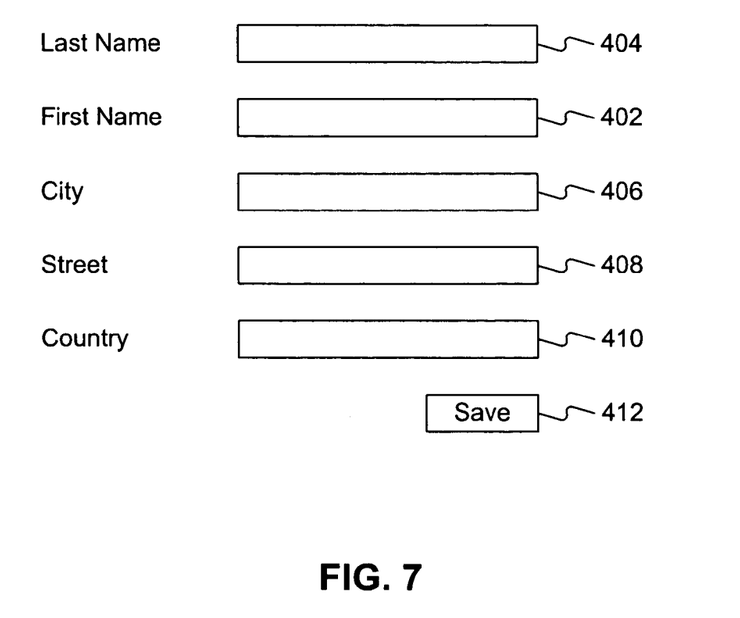
FIG. 7 illustrates another exemplary user interface consistent with certain disclosed embodiments.

In another example illustrated in FIG. 7, address table application 400 may be used by a customer that operates in a certain country where a different sequence for displaying first name and last name is used. The customer may adapt address table application 400 by changing the sequence of first name 402 and last name 404 in adaptation data 120. When rendering control 116 renders the address table, rendering control 116 may determine that first name 402 and last name 404 are exchanged and may present first name 402 and last name 404 in the exchanged order or format. On the other hand, when the customer enters information in first name 402 and last name 404 and selects "save" 412, input control 118 may determine that first name 402 and last name 404 are exchanged and may change the sequence back to the original settings. Thus, application domain 102 may still obtain first name 402 and last name 404 in the same sequence, the same consistent format, without any modification to application domain 102 or application state 112.

Returning to FIG. 3, after adaptation data 120 is generated (step 312), processor 202 may integrate the application layer (e.g., application domain 102, application state 112, etc.), the adaptation layer (e.g., framework 104), and/or the adaptation data into a complete application (e.g., application 100) (step 314).

Figure 8:
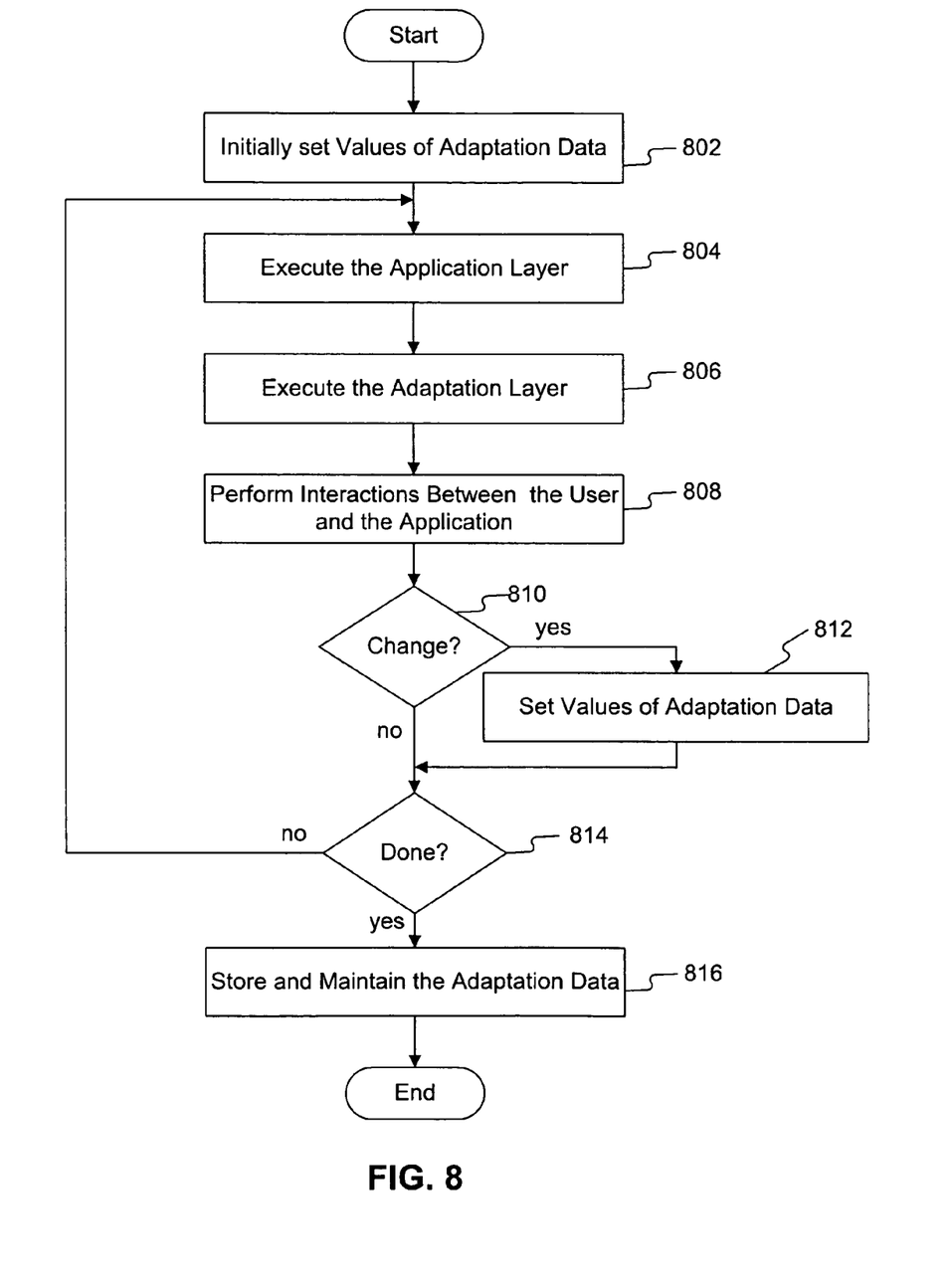
FIG. 8 illustrates a flowchart of an exemplary application adaptation and operation process consistent with certain disclosed embodiments.

Once application 100 is created, user 106 may use application 100 and may also make adaptations of application 100. FIG. 8 illustrates a flowchart of an exemplary application adaptation and operation process performed by processor 202 under instructions of user 106 and/or application 100.

As shown in FIG. 8, processor 202 may initially set values of adaptation data 120 to meet personalized requirements of user 106 (step 802). The values may be set offline (i.e., statically) or at runtime (i.e., dynamically) as well. If adaptation data is not available or created, processor 202 may also create adaptation data. As explained above, each UI element and/or UI control may be adapted separately. Each UI element and/or control may associate a tool, provided by framework 104, that allows user 106 to set and maintain adaptation data 120. Other configurations, however, may also be used.

Processor 202, or user 106 through processor 202, may set values of adaptation data 120 in different ways based on the type and characteristic of a particular UI element and/or UI control and corresponding tools for adaptation. For example, certain UI elements or controls may have associated editors to change values of adaptation data 120. Certain other UI elements or controls, such as changing the sequence of columns in a table, may be adapted by dragging a column to a different location in the table using input device 210 (e.g., a mouse, etc.). Further, certain other UI elements or controls, such as input fields, may be adapted by providing a generic context menu associated with each input field that allows setting desired values. Certain other UI elements or controls may also be adapted by using modal popup-like windows for user 106 to enter values. Other tools and methods may also be used.

After adaptation data 120 is set (step 802), processor 202 may start or execute application 100 by starting or executing the application layer (e.g., application domain 102, application state 112, etc.) (step 804) and starting or executing the adaptation layer (e.g., framework 104, rendering control 116, input control 118, etc.) (step 806). As explained above, the application layer and the adaptation layer may be executed on a same computer as separate programs or may be executed on different computers or different processors. Further, if data and controls 114 include active data (i.e., a combination of data and associated software programs), processor 202 may also start the associated software programs of data and controls 114. For example, in a distributed application, certain data communication protocols and data representation protocols, such as XML, CORBA, RPC, RMI, etc., may also be started.

Once application 100 is started, processor 202 may perform interactions between application 100 and user 106 (step 808). For example, results from application 100 may be presented to user 106, and user 106 may enter certain information to be processed by application 100. The presentation of the adaptation layer may be different because the information may be modified by adaptation data 120. User 106 may choose or personalize a particular presentation by setting proper corresponding adaptation data 120. The input from user 106 may be provided to application 100 (e.g., application state 112, etc.) in a consistent format because different input formats may be adjusted or modified according to adaptation data 120 such that input information to application 100 may be maintained in same format (e.g., all fields of a data element may be provided to application 100). Further, processor 202 may determine whether user 106 changes adaptation data 120 (step 810). If adaptation data 120 is changed (step 810; yes), processor 202 may set adaptation data 120 dynamically during the run time (step 812). If adaptation data 120 is not changed (step 810; no) or after the adaptation data 120 is set, the process may continue.

Processor 202 may determine whether application 100 ends (step 814). If application 100 does not end (step 814; no), processor 202 may continue performing interactions between application 100 and user 106 starting at step 804. On the other hand, if application ends (step 814; yes), processor 202 may store and maintain adaptation data 120 (step 816). As explained, adaptation data may be set or maintained per UI control, processor 202 may set or store either simply name/value pairs on the level of adapted UI element and/or control properties or may have a specific schema for each UI element and/or control class. Processor 202 may store adaptation data in any appropriate type of storage, such as data base 214, for the purpose of data persistency, separately from data of application 102. After adaptation data 120 is stored and/or maintained, processor 202 may complete the operation process.

Accordingly, software developer can configure software applications with layers consistent with the principle of the present invention. Such a configuration permits users to adapt the software applications in a way that would reduce the need for making further adaptations when the developer releases revisions or upgrade to the software applications.

Other embodiments, features, aspects, and principles of the disclosed exemplary methods and systems will be apparent to those skilled in the art and may be implemented in various environments and systems. For example, third party software applications may be adapted by implementing a framework consistent with the present invention without changing the third party software applications. In another example, a framework consistent the present invention may be implemented as an independent application that may be used to dynamically interact with other software applications to handle certain adaptation functionalities.

What is claimed is:

1. A computer-implemented method for creating a computer software application, comprising:
 structuring the application into an application layer and an adaptation layer;
 defining a plurality of data elements used by the application;
 establishing, by a processor, the application layer, based on the data elements, for processing the data elements;
 creating, by the processor, the adaptation layer comprising adaptation data compatible with the application layer and a rendering control configured to render the data elements modified by the adaptation data associated with the data elements, wherein the adaptation data enables plural presentations of the data elements by the rendering control of the adaptation layer independently from the application layer; and
 upgrading the application layer without modifying the adaptation data, wherein the upgraded application layer is compatible with the unmodified adaptation data.

2. The computer-implemented method according to claim 1,
 wherein the adaptation data comprises personalized requirements,
 wherein the adaptation layer receives the personalized requirements from a user and sets the adaptation data based on the personalized requirements while the application is running, and
 wherein the adaptation layer further comprises at least one software tool for the user to provide the personalization requirements by manipulating the adaptation data.

3. The computer-implemented method according to claim 2, wherein the data elements comprise a plurality of user interface controls and the personalized requirements comprise changing number and sequence of the plurality user interface controls.

4. The computer-implemented method according to claim 1, wherein the adaptation layer:
 receives user inputs, in different formats, corresponding to the data elements,
 modifies the user inputs to be in a consistent format by using the adaptation data, and
 provides the user inputs in the consistent format to the application layer.

5. The computer-implemented method according to claim 2, wherein the data elements comprise at least one user interface control.

6. The computer-implemented method according to claim 5, wherein the adaptation data comprises information for the rendering control to apply a default value for the user interface control.

7. The computer-implemented method according to claim 5, wherein the adaptation data comprises information for the rendering control to apply a visual characteristics of the user interface control.

8. A computer-implemented method for adapting a software application having an application layer and an adaptation layer, comprising:
 generating adaptation data compatible with the application layer to define a first presentation of a plurality of data elements shared by the application layer and the adaptation layer;
 storing the adaptation data in the adaptation layer;
 executing the application layer to process the data elements;
 executing, by a processor, the adaptation layer to perform the first presentation of the processed data elements based on the adaptation data;
 receiving, by the processor, personalized requirements for the data elements and modifying the adaptation data, based on the personalized requirements, to define a second presentation of the data elements during execution of the application, wherein the adaptation layer performs the second presentation of the processed data elements; and
 upgrading the application layer without modifying the adaptation layer, wherein the upgraded application layer is compatible with the unmodified adaptation layer.

9. The computer-implemented method according to claim 8, further comprising:
maintaining the adaptation data.

10. The computer-implemented method according to claim 8, wherein:
the adaptation data is generated using tools provided by the adaptation layer;
the data elements comprise a user interface control; and
the tools comprise a user interface control editor and a context menu.

11. The computer-implemented method according to claim 10, wherein the tools include at least means for dragging and dropping a user interface control.

12. A computer-implemented method for adapting a software application having an application layer and an adaptation layer, comprising:
generating adaptation data compatible with the application layer to define a first set of inputs corresponding to a plurality of data elements shared by the application layer and the adaptation layer;
storing the adaptation data in the adaptation layer;
executing the application layer to process the data elements;
executing, by a processor, the adaptation layer to:
receive user inputs in a first format and corresponding to the data elements,
modify the user inputs to be in a consistent format determined by the first set of inputs, and
provide the user inputs in the consistent format to the application layer;
editing, by the processor, the adaptation data to define a second set of inputs corresponding to the data elements during execution of the application, wherein the adaptation layer provides the user inputs, in a second format and corresponding to the data elements, to the application layer in the consistent format determined by modifying the user inputs by the second set of inputs; and
upgrading the application layer without modifying the adaptation data, wherein the upgraded application layer is compatible with the unmodified adaptation data.

13. The computer-implemented method according to claim 12, further comprising:
maintaining the adaptation data.

14. The computer-implemented method according to claim 12, wherein:
the adaptation data is generated using tools provided by the adaptation layer;
the data elements comprise a user interface control; and
the tools comprise a user interface control editor and a context menu.

15. The computer-implemented method according to claim 14, wherein the tools comprise means for dragging and dropping a user interface control.

16. A computer system comprising:
a database configured to store information of a computer software application; and
a processor configured to:
structure the application into an application layer and an adaptation layer;
define a plurality of data elements used by the application;
establish the application layer based on the data elements for processing the data elements;
create the adaptation layer comprising adaptation data compatible with the application layer and a rendering control configured to render the data elements modified by the adaptation data associated with the data elements, wherein the adaptation data enables plural presentations of the data elements by the rendering control of the adaptation layer independently from the application layer; and
upgrade the application layer without modifying the adaptation data, wherein the upgraded application layer is compatible with the unmodified adaptation data.

17. The computer system according to claim 16,
wherein the adaptation data comprises personalization requirements,
wherein the adaptation layer receives the personalized requirements from a user and sets the adaptation data based on the personalized requirements while the application is running, and
wherein the adaptation layer further comprises at least one software tool for the user to provide the personalization requirements by manipulating the adaptation data.

18. The computer system according to claim 16, wherein the adaptation layer:
receives user inputs, in different formats, corresponding to the data elements,
modifies the user inputs to be in a consistent format by using the adaptation data, and
provides the user inputs in the consistent format to the application layer.

19. The computer system according to claim 16, wherein the data elements comprise a user interface control within the data elements.

20. A computer system having a hardware processor, comprising:
means for structuring the application into an application layer and an adaptation layer;
means for defining a plurality of data elements used by the application;
means for establishing the application layer based on the plurality of data elements for processing the data elements;
means for creating the adaptation layer comprising adaptation data compatible with the application layer and a rendering control configured to render the data elements modified by the adaptation data associated with the data elements, wherein the adaptation data enables plural presentations of the data elements by the rendering control of the adaptation layer independently from the application layer, and
means for upgrading the application layer without modifying the adaptation data, wherein the upgraded application layer is compatible with the unmodified adaptation data,
wherein the adaptation layer:
receives user inputs, in different formats, corresponding to the data elements,
modifies the user inputs to be in a consistent format by using the adaptation data, and
provides the user inputs in the consistent format to the application layer.

* * * * *